US012735533B2

(12) United States Patent
Wu et al.

(10) Patent No.: US 12,735,533 B2
(45) Date of Patent: Sep. 15, 2026

(54) TOUGHENED RESIN COMPOSITION

(71) Applicant: ITEQ CORPORATION, Hsinchu County (TW)

(72) Inventors: Sheng-Yen Wu, Hsinchu County (TW); Po-Hsun Lee, Hsinchu County (TW); Chun-Ming Chiu, Hsinchu County (TW); Wen-Pin Su, Hsinchu County (TW); Jui-Teng Hsu, Hsinchu County (TW); Chen-Yu Huang, Hsinchu County (TW); Chun-Han Lin, Hsinchu County (TW)

(73) Assignee: ITEQ CORPORATION, Hsinchu County (TW)

( * ) Notice: Subject to any disclaimer, the term of this patent is extended or adjusted under 35 U.S.C. 154(b) by 899 days.

(21) Appl. No.: 17/964,158

(22) Filed: Oct. 12, 2022

(65) Prior Publication Data

US 2023/0348673 A1 Nov. 2, 2023

(30) Foreign Application Priority Data

Apr. 29, 2022 (CN) ......................... 202210475666.7

(51) Int. Cl.

| | |
|---|---|
| ***C08G 73/10*** | (2006.01) |
| ***C08J 5/24*** | (2006.01) |
| ***C08K 3/36*** | (2006.01) |
| ***C08K 7/14*** | (2006.01) |

(52) U.S. Cl.

CPC .......... *C08G 73/1067* (2013.01); *C08J 5/244* (2021.05); *C08K 3/36* (2013.01); *C08K 7/14* (2013.01); *C08J 2379/08* (2013.01)

(58) Field of Classification Search

None

See application file for complete search history.

(56) References Cited

U.S. PATENT DOCUMENTS

| | | | | |
|---|---|---|---|---|
| 2017/0313906 | A1* | 11/2017 | Karp | C09J 4/00 |
| 2018/0187040 | A1* | 7/2018 | Wan | C09D 151/06 |
| 2019/0169432 | A1* | 6/2019 | Tonouchi | B32B 5/28 |
| 2020/0148881 | A1* | 5/2020 | Yu | C08F 283/10 |

FOREIGN PATENT DOCUMENTS

| | | | |
|---|---|---|---|
| CN | 101481490 | A | 7/2009 |
| CN | 104559068 | A | 4/2015 |
| CN | 104955873 | A | 9/2015 |
| CN | 107365476 | A | 11/2017 |
| CN | 107810217 | A | 3/2018 |
| CN | 109294146 | A | 2/2019 |
| CN | 109312156 | A | 2/2019 |
| CN | 112210208 | A | 1/2021 |
| TW | 201520321 | A | 6/2015 |
| TW | 201739829 | A | 11/2017 |

OTHER PUBLICATIONS

Office Action dated Jan. 16, 2023 issued in the corresponding Taiwan patent application No. 111117650.

* cited by examiner

*Primary Examiner* — Randy P Gulakowski
*Assistant Examiner* — Holley Grace Hester
(74) *Attorney, Agent, or Firm* — BACON & THOMAS, PLLC

(57) ABSTRACT

The present disclosure provides a toughened resin composition, which includes: (A) a toughened and modified compound, which includes a styrene maleic anhydride compound, an anhydride grafted olefin polymer, and a diisocyanate compound; (B) a thermosetting polymer; and (C) a toughening resin; wherein, in the toughened and modified compound, the diisocyanate compound forms a polyimide bond with the styrene maleic anhydride compound and the anhydride grafted olefin polymer, respectively. The present disclosure has high toughness and excellent mechanical properties; thus, it may have a wide range of applications in the fields of electronics, aerospace and the like.

16 Claims, 1 Drawing Sheet

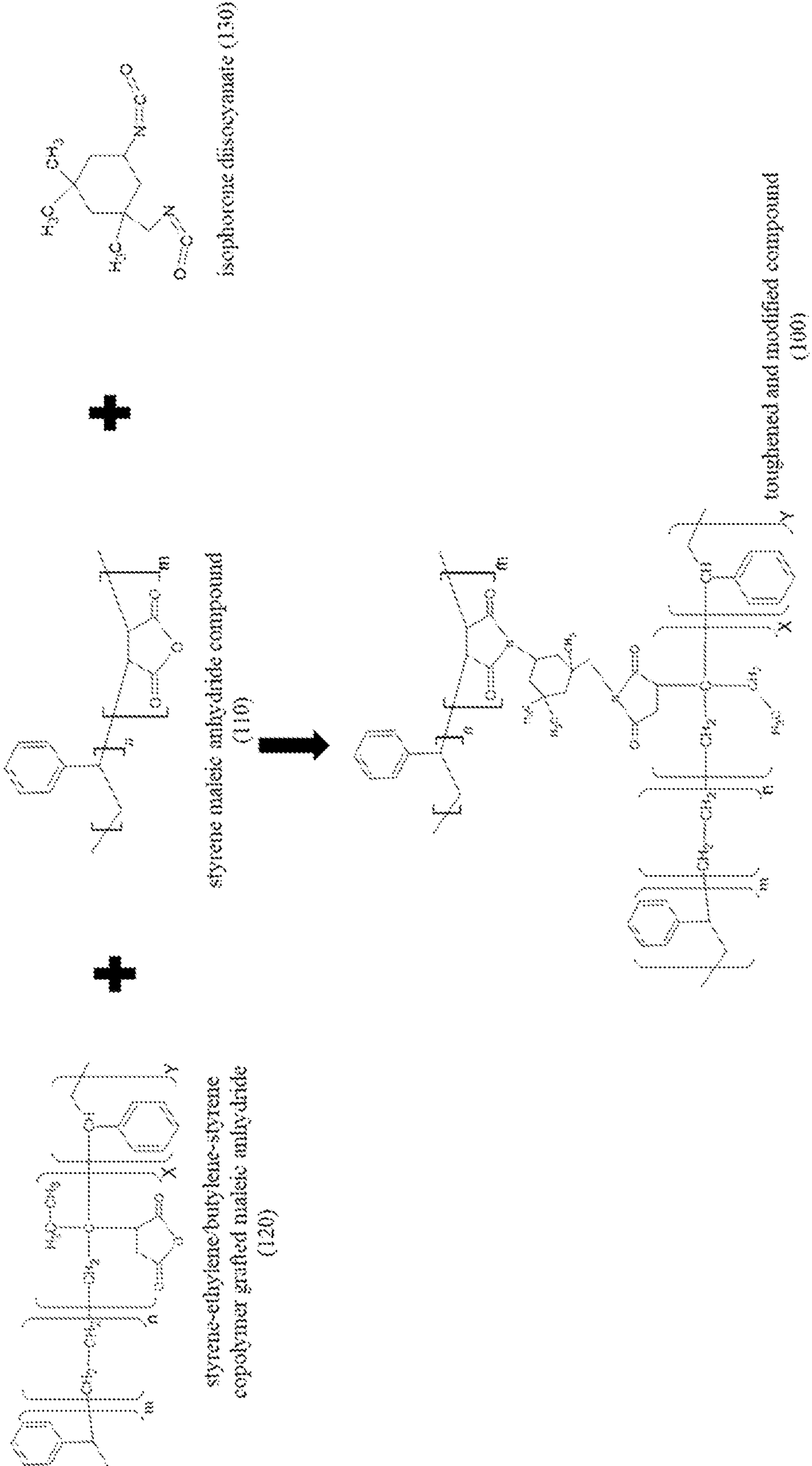
isophorone diisocyanate (130)
styrene maleic anhydride compound (110)
styrene-ethylene-butylene-styrene copolymer grafted maleic anhydride (120)
toughened and modified compound (100)

TOUGHENED RESIN COMPOSITION

BACKGROUND

Technical Field

The present disclosure relates to a toughened resin composition, in particular to a resin composition having an olefin polymer toughened and modified styrene maleic anhydride compound.

Description of Related Art

Styrene maleic anhydride (SMA) is a copolymer formed by the polymerization of styrene monomer and maleic anhydride monomer. The main features of styrene maleic anhydride polymer are its excellent electrical properties, high heat resistance and high dimensional stability, and are widely used in industry and commerce.

However, the styrene maleic anhydride polymer also has some disadvantages. For example, after curing and cross-linking, the styrene maleic anhydride polymer is hard and brittle, so the mechanical properties are not good. When applied to copper clad laminate (CCL), due to the hard and brittle characteristics of SMA after cross-linking, it will cause cracks and white streaks in the CCL during drilling process of the printed circuit board (PCB), which will lead to short circuit failure. In order to improve this poor processing phenomenon, additional rubber or toughening agent is generally added to increase toughness in order to improve cracks and white streaks. If the improvement effect is not good enough, a large amount of addition is required to achieve the improvement effect. However, the addition of a large amount of rubber or toughening agent may have an effect on the physical or dielectric properties of the polymer.

SUMMARY

In view of this, the inventors have devoted themselves to the aforementioned related art, researched intensively try to solve problems of improving the properties of the styrene maleic anhydride polymer, so that its resin composition has high toughness and excellent mechanical properties.

The main purpose of the present disclosure is to provide a toughened resin composition, including: (A) a toughened and modified compound, which includes a styrene maleic anhydride compound, an anhydride grafted olefin polymer, and a diisocyanate compound; (B) a thermosetting polymer; and (C) a toughening resin; wherein, in the toughened and modified compound, the diisocyanate compound forms a polyimide bond with the styrene maleic anhydride compound and the anhydride grafted olefin polymer, respectively.

In some embodiments, in the toughened resin composition, (A):(B):(C) is 15 to 30:20 to 35:0.1 to 5.

In some embodiments, the toughening resin is a core-shell polymer and/or a polybutadiene resin.

In some embodiments, the thermosetting polymer is bismaleimide (BMI) resin, bismaleimide triazine polymer, cyanate ester polymer, benzocyclobutene polymer, or phenolic resin.

In some embodiments, the ratio of styrene and maleic anhydride in the styrene maleic anhydride compound is 3:1 to 6:1.

In some embodiments, the anhydride grafted olefin polymer includes: styrene-ethylene/butylene-styrene copolymer grafted maleic anhydride, polypropylene grafted maleic anhydride or polyethylene grafted maleic anhydride.

In some embodiments, the diisocyanate compound is selected from the group consist of trimethylene diisocyanate, tetramethylene diisocyanate, pentamethylene diisocyanate, hexamethylene diisocyanate, 1,2-propylene diisocyanate, 1,3-butylene diisocyanate, dodecamethylene diisocyanate, 2,4,4-trimethylhexamethylene diisocyanate, 1,3-cyclopentene diisocyanate, 1,3-cyclohexane diisocyanate, 1,4-cyclohexane diisocyanate, methylene dicyclohexyl diisocyanate, isophorone diisocyanate, hydrogenated diphenylmethane diisocyanate, hydrogenated xylylene diisocyanate, hydrogenated toluene diisocyanate, hydrogenated tetramethyl xylylene diisocyanate, phenylene diisocyanate, 2,4-toluene diisocyanate, 2,6-toluene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate and xylylene diisocyanate.

In some embodiments, the toughened resin composition further includes: a filler, and the filler is selected from the group consist of silicon dioxide, aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, barium sulfate, magnesium carbonate, barium carbonate, mica, talc and graphene.

In some embodiments, the toughened resin composition further includes: a polybenzoxazine compound, and the polybenzoxazine compound is a bisphenol type polybenzoxazine or a bisamine type polybenzoxazine.

In some embodiments, the toughened resin composition further includes: a solvent, and the solvent is selected from the group consist of toluene, γ-butyrolactone, methyl ethyl ketone, cyclohexanone, butanone, acetone, xylene, methyl isobutyl ketone, N,N-dimethylformamide, N,N-dimethyl acetamide, N-methylpyrrolidone and combinations thereof.

Therefore, the toughened resin composition provided by the present disclosure includes a toughened and modified compound, which is a styrene maleic anhydride compound toughened and modified by an olefin polymer, and formed a polyimide bond with a diisocyanate compound. As a result, the toughened resin compound of the present disclosure has excellent mechanical properties and electrical properties, and low water absorption. The toughened resin compound of the present disclosure has high toughness and excellent mechanical properties, and can be blended with other thermosetting polymers, inorganic fillers or fibers to form composite materials. Thus, the toughened resin compound has a wide range of application in the fields of electronic, aerospace and the like.

BRIEF DESCRIPTION OF THE DRAWING

The details of one or more embodiments of the subject matter described in the present disclosure are set forth in the accompanying drawing and the description below. Other features, aspects and advantages of the subject matter of this disclosure will become apparent from the description, drawing, and claims, in which:

FIG. 1 is the reaction formula schematic diagram, in accordance with some embodiments.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Unless otherwise defined, all technical and scientific terms used herein have the same meaning as understood by one of ordinary skill in the art to which this disclosure belongs. As used in this application, the following terms have the following meanings.

As used herein, terms such as "first," "second," "third," "fourth," and "fifth" describe various elements, components, regions, layers, and/or section, these elements, components, regions, layers and/or sections should not be limited by these terms. These terms are only used to distinguish one element, component, region, layer or section from another. Terms such as "first," "second," "third," "fourth," and "fifth" when used herein do not imply a sequence or order unless the context clearly dictates otherwise.

Unless otherwise stated, "or" as used herein means "and/or". As used herein, the terms "comprise," "have," "contain," and "include" are intended to not exclude the presence or addition of one or more other components, steps, operations and/or elements to the described components, steps, operations and/or elements; similarly, "comprise," "have," "contain," and "include" described herein can be substituted for each other without limitation. The terms "a," "an," and "the" are understood to encompass the plural as well as the singular (ie, at least one). The expression "one or more" means "at least one" and thus may include an individual characteristic or mixtures/combinations.

The present disclosure provides a toughened resin composition, including: (A) a toughened and modified compound, which includes a styrene maleic anhydride compound, an anhydride grafted olefin polymer, and a diisocyanate compound; (B) a thermosetting polymer; and (C) a toughening resin; wherein, in the toughened and modified compound, the diisocyanate compound forms a polyimide bond with the styrene maleic anhydride compound and the anhydride grafted olefin polymer, respectively.

The "styrene maleic anhydride compound" described herein includes a copolymer formed by the polymerization of styrene monomer and maleic anhydride monomer, i.e., styrene maleic anhydride (SMA). In some embodiments, the ratio of styrene and maleic anhydride in the styrene maleic anhydride compound is 3:1 to 6:1, for example but not limited to: 3:1 to 6:1, 3:1 to 5:1, 3:1 to 4:1, 4:1 to 6:1, 5:1 to 6:1 or between any two of the preceding ratios. In some embodiments, the ratio of styrene and maleic anhydride in the styrene maleic anhydride compound is 3:1, 4:1, 5:1, or 6:1.

The "anhydride grafted olefin polymer" described herein has excellent electrical properties and good impact resistance properties. In some embodiments, the olefin polymer of the anhydride grafted olefin polymer of the present disclosure is grafted with maleic anhydride, which has good compatibility with the base resin and may achieve the modification effect. In some embodiments, examples of the anhydride grafted olefin polymer include, but are not limited to, styrene-ethylene/butylene-styrene copolymer grafted maleic anhydride (SEBS-g-MA), polypropylene grafted maleic anhydride (PP(Poly Propylene)-g-MA) or polyethylene grafted maleic anhydride (PE(Poly Ethylene)-g-MA).

The "diisocyanate compound" described herein is used as a modifier. In the toughened and modified compound, there is a polyimide bond between a diisocyanate of the diisocyanate compound and an acid anhydride of the styrene maleic anhydride compound and an acid anhydride of the anhydride grafted olefin polymer, respectively, so as to achieve chemical modification. Cyanate ester compounds may increase the reactive functional groups in the resin structure, thereby increasing the crosslinking density of the epoxy cured product and improving the heat resistance. Examples of the cyanate ester compound include, but are not limited to, a multifunctional aliphatic isocyanate compound, a multifunctional alicyclic isocyanate compound, a multifunctional aromatic isocyanate compound, such as trimethylene diisocyanate, tetramethylene diisocyanate, pentamethylene diisocyanate, hexamethylene diisocyanate, 1,2-propylene diisocyanate, 1,3-butylene diisocyanate, dodecamethylene diisocyanate, 2,4,4-trimethylhexamethyl ene dii socyanate, 1,3-cyclopentene dii socyanate, 1,3-cyclohexane diisocyanate, 1,4-cyclohexane diisocyanate, methylene dicyclohexyl diisocyanate, isophorone diisocyanate, hydrogenated diphenylmethane diisocyanate, hydrogenated xylylene diisocyanate, hydrogenated toluene diisocyanate, hydrogenated tetramethyl xylylene diisocyanate, phenylene diisocyanate, 2,4-toluene diisocyanate, 2,6-toluene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, xylylene diisocyanate and the like. In some embodiments, the diisocyanate compound includes: isophorone diisocyanate (IPDI), methylene dicyclohexyl diisocyanate (hydrogenated MDI or HMDI) or hexamethylene diisocyanate (HDI).

In some embodiments, the toughened and modified compound of the present disclosure includes a compound selected from the group consist of isophorone diisocyanate modified styrene-ethylene/butyl ene-styrene copolymer grafted maleic anhydride toughened styrene maleic anhydride compound (IPDI/SEBS-g-MA/SMA), methylene dicyclohexyl diisocyanate modified styrene-ethylene/butylene-styrene copolymer grafted maleic anhydride toughened styrene maleic anhydride compound (HMDI/SEBS-g-MA/SMA), hexamethylene diisocyanate modified styrene-ethylene/butylene-styrene copolymer grafted maleic anhydride toughened styrene maleic anhydride compound (HDI/SEBS-g-MA/SMA), isophorone diisocyanate modified polypropylene grafted maleic anhydride toughened styrene maleic anhydride compound (IPDI/PP-g-MA/SMA), methylene dicyclohexyl diisocyanate modified polypropylene grafted maleic anhydride toughened styrene maleic anhydride compound (HMDI/PP-g-MA/SMA), hexamethylene diisocyanate modified polypropylene grafted maleic anhydride toughened styrene maleic anhydride compound (HDI/PP-g-MA/SMA), isophorone diisocyanate modified polyethylene grafted maleic anhydride toughened styrene maleic anhydride compound (IPDI/PE-g-MA/SMA), methylene dicyclohexyl diisocyanate modified polyethylene grafted maleic anhydride toughened styrene maleic anhydride compound (HMDI/PE-g-MA/SMA) and hexamethylene diisocyanate modified polyethylene grafted maleic anhydride toughened styrene maleic anhydride compound (HDI/PE-g-MA/SMA).

In some embodiments, in the toughened resin composition of the present disclosure, the composition ratio of (A) the toughened and modified compound: (B) the thermosetting polymer: (C) the toughening resin is about 15 to 30:20 to 35:0.1 to 5. For example, but not limited to, (A) the toughened and modified compound is 15% to 30% of the overall resin composition, such as 15%, 16%, 17%, 18%, 19%, 20%, 21%, 22%, 23%, 24%, 25%, 26%, 27%, 28%, 29%, 30% or between any two of the preceding values; (B)

the thermosetting polymer is 20% to 35% of the overall resin composition, such as 20%, 21%, 22%, 23%, 24%, 25%, 26%, 27%, 28%, 29%, 30%, 31%, 32%, 33%, 34%, 35% or between any two of the preceding values; and (C) the toughening resin is 0.1% to 5% of the overall resin composition, such as 0.1%, 0.5%, 1%, 1.5%, 2%, 2.5%, 3%, 3.5%, 4%, 4.5%, 5% or between any two of the preceding values.

In some embodiments, the toughening resin is, for example but not limited to, a core-shell polymer and/or a polybutadiene resin. The core-shell polymer is such as core shell rubber (CSR). The polybutadiene resin is, for example, a polybutadiene homopolymer or a butadiene-styrene copolymer.

Examples of the thermosetting polymer of the present disclosure include, but are not limited to, bismaleimide (BMI) resin, bismaleimide triazine polymer, cyanate ester polymer, benzocyclobutene polymer, or phenolic resin. In some embodiments, the thermosetting polymer of the present disclosure is BMI resin. BMI resin has a carbonyl group and a nitrogen-containing epoxy resin, and is cured by the unsaturation of the end groups during processing and molding, and no volatile substances are generated during the curing process, which will facilitate the processing and molding of composite materials.

In some aspects, the toughened resin composition of the present disclosure may further include: a filler, a polybenzoxazine compound and/or a solvent.

In some embodiments, the filler is an inorganic filler, for example but not limited to, selected from the group consist of silicon dioxide, aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, barium sulfate, magnesium carbonate, barium carbonate, mica, talc and graphene.

In some embodiments, the polybenzoxazine compound is a bisphenol type polybenzoxazine or a bisamine type polybenzoxazine. In some embodiments, the polybenzoxazine compound is at least one selected from the group consisting of bisphenol A type benzoxazine (BPA-BZ), bisphenol F type benzoxazine (BPF-BZ), bisphenol S type benzoxazine (BPS-BZ), diaminodiphenylmethane type benzoxazine (DDM-BZ), diaminodiphenyl ether type benzoxazine (ODA-BZ) and polybenzoxazine with polyimide.

In some embodiments, the solvent is selected from the group consist of toluene, γ-butyrolactone, methyl ethyl ketone, cyclohexanone, butanone, acetone, xylene, methyl isobutyl ketone, N,N-dimethylformamide, N,N-dimethylacetamide, N-methylpyrrolidone and combinations thereof.

The toughened resin composition not only forms the chemical modification of polyimide bond through the reaction of isocyanate and acid anhydride, but also through the modification of olefin polymer and styrene maleic anhydride compound, to achieve the effect of toughening improvement, so that the toughened resin composition has high toughness and excellent mechanical properties. Further, if the toughened resin composition is blended with other materials, a composite material with excellent properties may be formed.

EXAMPLES

Hereinafter, the present disclosure will be further described in terms of detailed descriptions and examples, however, it should be understood that these examples are only provided to assist in making the present disclosure easier to understand, as well as to clarify various aspects of the present disclosure and the benefits achieved, and are not intended to limit the scope of the present disclosure.

Example 1

Seven toughened and modified compounds (Example compounds A-G) were prepared according to the present disclosure. Metal foil laminates were subsequently prepared using Example Compounds A-G.

Example Compound A

Please refer to the exemplary reaction formula of FIG. 1. In FIG. 1, m, n, X, and Y are the same or different positive integers. 200 g of styrene maleic anhydride compound 110 (Styrene/maleic anhydride ratio of 3/1) and 600 g of toluene were added into a 3-liter four-port separable reaction flask equipped with a heating device, a thermometer, a mixer, and a cooling pipe, the temperature was raised to about 60° C., and stirred uniformly. Under stirring, 5 g of SEBS-g-MA 120 was gradually added to the toluene solution within 20 minutes, and the temperature of the synthesis solution was raised to 90° C. to dissolve it completely. Subsequently, about 5 g of IPDI 130 was added, the synthesis solution was heated and gradually raised to about 130° C., and reacted for 1 hour. Then, the heating was stopped and the temperature was lowered to room temperature to obtain Example Compound A, that is, the toughened and modified compound 100.

Example Compound B 200 g of styrene maleic anhydride compound (Styrene/maleic anhydride ratio of 3/1) and 600 g of toluene were added into a 3-liter four-port separable reaction flask equipped with a heating device, a thermometer, a mixer, and a cooling pipe, the temperature was raised to about 60° C., and stirred uniformly. Under stirring, 5 g of PP-g-MA was gradually added to the toluene solution within 20 minutes, and the temperature of the synthesis solution was raised to 90° C. to dissolve it completely. Subsequently, about 5 g of IPDI was added, the synthesis solution was heated and gradually raised to about 130° C., and reacted for 1 hour. Then, the heating was stopped and the temperature was lowered to room temperature to obtain Example Compound B.

Example Compound C 200 g of styrene maleic anhydride compound (Styrene/maleic anhydride ratio of 3/1) and 600 g of toluene were added into a 3-liter four-port separable reaction flask equipped with a heating device, a thermometer, a mixer, and a cooling pipe, the temperature was raised to about 60° C., and stirred uniformly. Under stirring, 5 g of PE-g-MA was gradually added to the toluene solution within 20 minutes, and the temperature of the synthesis solution was raised to 90° C. to dissolve it completely. Subsequently, about 5 g of IPDI was added, the synthesis solution was heated and gradually raised to about 130° C., and reacted for 1 hour. Then, the heating was stopped and the temperature was lowered to room temperature to obtain Example Compound C.

Example Compound D 200 g of styrene maleic anhydride compound (Styrene/maleic anhydride ratio of 4/1) and 600 g of toluene were added into a 3-liter four-port separable reaction flask equipped with a heating device, a thermometer, a mixer, and a cooling pipe, the temperature was raised to about 60° C., and stirred uniformly. Under stirring, 5 g of SEBS-g-MA was gradually added to the toluene solution within 20 minutes, and the temperature of the synthesis solution was raised to 90° C. to dissolve it completely. Subsequently, about 5 g of IPDI was added, the synthesis solution was heated and gradually raised to about 130° C., and reacted for 1 hour. Then, the heating was stopped and the temperature was lowered to room temperature to obtain Example Compound D.

Example Compound E 200 g of styrene maleic anhydride compound (Styrene/maleic anhydride ratio of 6/1) and 600 g of toluene were added into a 3-liter four-port separable reaction flask equipped with a heating device, a thermometer, a mixer, and a cooling pipe, the temperature was raised to about 60° C., and stirred uniformly. Under stirring, 5 g of SEBS-g-MA was gradually added to the toluene solution within 20 minutes, and the temperature of the synthesis solution was raised to 90° C. to dissolve it completely. Subsequently, about 5 g of IPDI was added, the synthesis solution was heated and gradually raised to about 130° C., and reacted for 1 hour. Then, the heating was stopped and the temperature was lowered to room temperature to obtain Example Compound E.

Example Compound F 200 g of styrene maleic anhydride compound (Styrene/maleic anhydride ratio of 3/1) and 600 g of toluene were added into a 3-liter four-port separable reaction flask equipped with a heating device, a thermometer, a mixer, and a cooling pipe, the temperature was raised to about 60° C., and stirred uniformly. Under stirring, 5 g of SEBS-g-MA was gradually added to the toluene solution within 20 minutes, and the temperature of the synthesis solution was raised to 90° C. to dissolve it completely. Subsequently, about 5 g of HMDI was added, the synthesis solution was heated and gradually raised to about 130° C., and reacted for 1 hour. Then, the heating was stopped and the temperature was lowered to room temperature to obtain Example Compound F.

Example Compound G 200 g of styrene maleic anhydride compound (Styrene/maleic anhydride ratio of 3/1) and 600 g of toluene were added into a 3-liter four-port separable reaction flask equipped with a heating device, a thermometer, a mixer, and a cooling pipe, the temperature was raised to about 60° C., and stirred uniformly. Under stirring, 5 g of SEBS-g-MA was gradually added to the toluene solution within 20 minutes, and the temperature of the synthesis solution was raised to 90° C. to dissolve it completely. Subsequently, about 5 g of HDI was added, the synthesis solution was heated and gradually raised to about 130° C., and reacted for 1 hour. Then, the heating was stopped and the temperature was lowered to room temperature to obtain Example Compound G.

Materials

Styrene maleic anhydride compounds with styrene/maleic anhydride ratios of 3/1, 4/1 and 6/1 were produced by Polyscope Corporation; SEBS-g-MA was produced by Taiwan LCY Chemical Corporation; PP-g-MA was produced by ExxonMobil Chemical Company (product number: Exxelor™ PO 1015); and PE-g-MA was produced by ExxonMobil Chemical Company (product number: Exxelor™ PE 1040).

The following Table 1 is the preparation components and contents of the Example Compounds A-G.

TABLE 1

| | | Example Compound | | | | | | |
|---|---|---|---|---|---|---|---|---|
| | | A | B | C | D | E | F | G |
| Anhydride grafted olefin polymer | SEBS-g-MA | 5 | | | 5 | 5 | 5 | 5 |
| | PP-g-MA | | 5 | | | | | |
| | PE-g-MA | | | 5 | | | | |
| SMA | SMA (3/1) | 200 | 200 | 200 | | | 200 | 200 |
| | SMA (4/1) | | | | 200 | | | |
| | SMA (6/1) | | | | | 200 | | |
| Solvent | Toluene | 600 | 600 | 600 | 600 | 600 | 600 | 600 |
| Modifier | IPDA | 5 | 5 | 5 | 5 | 5 | | |
| | HMDI | | | | | | 5 | |
| | HDI | | | | | | | 5 |

Note:
In the table, SMA (3/1) represents a styrene maleic anhydride compound with styrene/maleic anhydride ratio of 3/1; SMA (4/1) represents a styrene maleic anhydride compound with styrene/maleic anhydride ratio of 4/1; and SMA (6/1) represents a styrene maleic anhydride compound with a styrene/maleic anhydride ratio of 6/1.

Example 2

The following provides non-limiting methods for preparing the toughened and modified compounds of the present disclosure into metal foil laminates. Ten non-limiting example laminates (Example Laminates 1-10) with the Example Compounds and six comparative example laminates (Comparative Example Laminates 1-6) were prepared according to methods similar to those described below. However, the specific methods for preparing Example Laminates 1-10 and Comparative Example Laminates 1-6 generally differ from the methods disclosed below in one or more respects.

Example Laminate 1

Preparation of resin composition: 30 g of the solution of Example Compound A was taken, and 10 g of BPA-Benzoxazine (BPA-BZ), 5 g of thermosetting resin (BMI), 25 g of epoxy resin (brominated epoxy), 1 g of roughening resin (Ricon 100), and 40 g of solvent (Methyl Ethyl Ketone, MEK) were added, and uniformly mix with a homogenizer to dissolve the components. After all the components were completely dissolved, 30 g of silicon dioxide was added, and the mixture was continuously mixed and dispersed in the solvent with a homogenizer to prepare a varnish liquid resin composition.

Preparation of prepreg: The reinforcing material glass fiber cloth (substrate E-Glass) was impregnated or coated the above-mentioned varnish liquid resin composition, and the impregnated or coated substrate E-Glass was dried at a temperature of 80° C. for 3 minutes and at a temperature of 180° C. for 7 minutes, thereby a prepreg in a semi-cured state (B-stage) was obtained.

Preparation of metal foil laminate: Four prepregs were laminated, and a 0.5-ounce metal foils (copper foil) was laminated on the outermost layers on both sides, respectively, and then placed in a hot press for high-temperature hot-press curing. The hot-pressing conditions were: heating up to 200° C. to 220° C. with a heating rate of 3.0° C./min, and at this temperature, hot-pressing for 180 minutes at a total pressure of 15 kg/cm$^2$ (initial pressure of 8 kg/cm$^2$). Then, a copper foil laminate as Example Laminate 1 was obtained.

Example Laminates 2-10

Example Laminates 2-10 were prepared according to methods similar to that of Example Laminate 1, however, the methods of preparing Example Laminates 2-10 may differ in one or more aspects as shown in Table 2 below.

Table 2 shows the preparation components and contents of Example Laminates 1-10, as well as the measurement results of physical properties such as adhesive strength, thermal expansion coefficient in the Z-axis direction, and heat resistance, and the test results of dielectric properties and white streak test of Example Laminates 1-10.

Preparation of prepreg: The reinforcing material glass fiber cloth (substrate E-Glass) was impregnated or coated the above-mentioned varnish liquid resin composition, and the impregnated or coated substrate E-Glass was dried at a temperature of 80° C. for 3 minutes and at a temperature of 180° C. for 7 minutes, thereby a prepreg in a semi-cured state (B-stage) was obtained.

Preparation of metal foil laminate: Four prepregs were laminated, and a 0.5-ounce metal foils (copper foil) was laminated on the outermost layers on both sides, respectively, and then placed in a hot press for high-temperature hot-press curing. The hot-pressing conditions were: heating up to 200° C. to 220° C. with a heating rate of 3.0° C./min, and at this temperature, hot-pressing for 180 minutes at a total pressure of 15 kg/cm$^2$ (initial pressure of 8 kg/cm$^2$). Then, a copper foil laminate as Comparative Example Laminate 1 was obtained.

TABLE 2

| | | Example Laminate | | | | | | | | | |
|---|---|---|---|---|---|---|---|---|---|---|---|
| | | 1 | 2 | 3 | 4 | 5 | 6 | 7 | 8 | 9 | 10 |
| Example Compound | A | 30 | | | | | | | 20 | 25 | 35 |
| | B | | 30 | | | | | | | | |
| | C | | | 30 | | | | | | | |
| | D | | | | 30 | | | | | | |
| | E | | | | | 30 | | | | | |
| | F | | | | | | 30 | | | | |
| | G | | | | | | | 30 | | | |
| | BPA-BZ | 10 | 10 | 10 | 10 | 10 | 10 | 10 | 10 | 10 | 10 |
| Thermo-setting resin | BMI | 5 | 5 | 5 | 5 | 5 | 5 | 5 | 5 | 5 | 5 |
| | KI-70 | | | | | | | | | | |
| Epoxy resin | Brominated epoxy | 25 | 25 | 25 | 25 | 25 | 25 | 25 | 35 | 30 | 20 |
| Toughening resin | Ricon 100 | 1 | 1 | 1 | 1 | 1 | 1 | 1 | | | |
| | CSR | | | | | | | | 1 | 1 | 0.5 |
| Filler | $SiO_2$ | 30 | 30 | 30 | 30 | 30 | 30 | 30 | 30 | 30 | 30 |
| Solvent | MEK | 40 | 40 | 40 | 40 | 40 | 40 | 40 | 40 | 40 | 40 |
| Reinforcing material | Glass Cloth | EG | EG | EG | EG | EG | EG | EG | EG | EG | EG |
| Measuring physical properties | Tg (TMA) ° C. | 172 | 176 | 169 | 173 | 178 | 169 | 176 | 173 | 172 | 172 |
| | Z-CTE % | 3.1% | 2.9% | 2.8% | 3.1% | 3.4% | 3.3% | 3.5% | 3.6% | 3.4% | 3.2% |
| | Adhesive strength lbf/in | 5.7 | 5.4 | 5.9 | 5.2 | 5.4 | 5.3 | 5.3 | 5.2 | 5.1 | 5.7 |
| | Heat resistance 288° C. | ○ | ○ | ○ | ○ | ○ | ○ | ○ | ○ | ○ | ○ |
| | White streaks | 0/100 | 0/100 | 0/100 | 0/100 | 0/100 | 0/100 | 0/100 | 0/100 | 0/100 | 0/100 |
| | Dielectric constant ($D_k$) | 3.9 | 3.9 | 3.8 | 3.9 | 3.8 | 3.8 | 3.8 | 3.9 | 3.7 | 3.8 |
| | Dissipation factor ($D_f$) | 0.0072 | 0.0071 | 0.0070 | 0.0069 | 0.0068 | 0.0072 | 0.0071 | 0.0073 | 0.0072 | 0.0072 |

Note:
In the table, SMA (3/1) represents a styrene maleic anhydride compound with styrene/maleic anhydride ratio of 3/1; SMA (4/1) represents a styrene maleic anhydride compound with styrene/maleic anhydride ratio of 4/1; and SMA (6/1) represents a styrene maleic anhydride compound with a styrene/maleic anhydride ratio of 6/1. In the table, CSR represents the core-shell rubber body; Ricon 100 is a butadiene-styrene copolymer; EG represents E-Glass. The addition unit of each component in the table is grams.

Comparative Example Laminate 1

Preparation of resin composition: 7.5 g of SMA (styrene/maleic anhydride ratio of 3/1) without toughening and modification was dissolved in 22.5 g of toluene, and 10 g of BPA-BZ, 5 g of thermosetting resin (BMI), 25 g of epoxy resin (brominated epoxy), 2.5 g of roughening resin (Ricon 100), and 40 g of solvent (MEK) were added, and uniformly mix with a homogenizer to dissolve the components. After all the components were completely dissolved, 30 g of silicon dioxide was added, and the mixture was continuously mixed and dispersed in the solvent with a homogenizer to prepare a varnish liquid resin composition.

Comparative Example Laminates 2-6

Comparative Example Laminates 2-6 were prepared according to methods similar to that of Comparative Example Laminate 1, however, the methods of preparing Comparative Example Laminates 2-6 may differ in one or more aspects as shown in Table 3 below.

Table 3 shows the preparation components and contents of Comparative Example Laminates 1-6, as well as the measurement results of physical properties such as adhesive strength, thermal expansion coefficient in the Z-axis direction, and heat resistance, and the test results of dielectric properties and white streak test of Comparative Example Laminates 1-6.

TABLE 3

| | | Comparative Example Laminate | | | | | |
|---|---|---|---|---|---|---|---|
| | | 1 | 2 | 3 | 4 | 5 | 6 |
| SMA without modification | SMA (3/1) | 30 | | | 25 | 35 | 30 |
| | SMA (4/1) | | 30 | | | | |
| | SMA (6/1) | | | 30 | | | |
| | BPA-BZ | 10 | 10 | 10 | 10 | 10 | 10 |
| Thermosetting resin | BMI | 5 | 5 | 5 | 5 | 5 | 5 |
| | KI-70 | | | | | | |
| Epoxy resin | Brominated epoxy | 25 | 25 | 25 | 30 | 20 | 25 |
| Toughening resin | Ricon 100 | 2.5 | 3.5 | 5 | | | |
| | CSR | | | | 2.5 | 3.5 | 5 |
| Filler | $SiO_2$ | 30 | 30 | 30 | 30 | 30 | 30 |
| Solvent | MEK | 40 | 40 | 40 | 40 | 40 | 40 |
| Reinforcing material | Glass Cloth | EG | EG | EG | EG | EG | EG |
| Measuring physical properties | Tg (TMA) ° C. | 169 | 165 | 158 | 168 | 162 | 163 |
| | Z-CTE % | 3.5% | 3.7% | 4.2% | 3.3% | 3.8% | 4.1% |
| | Adhesive strength lbf/in | 4.7 | 5.0 | 5.4 | 4.6 | 4.8 | 5.6 |
| | Heat resistance 288° C. | ○ | x | x | ○ | x | x |
| | White streaks | 80/100 | 45/100 | 25/100 | 95/100 | 65/100 | 39/100 |
| | Dielectric constant ($D_k$) | 3.8 | 3.7 | 3.6 | 3.8 | 3.8 | 3.6 |
| | Dissipation factor ($D_f$) | 0.0080 | 0.0077 | 0.0074 | 0.0076 | 0.0078 | 0.0082 |

Note:
In the table, SMA (3/1) represents a styrene maleic anhydride compound with styrene/maleic anhydride ratio of 3/1; SMA (4/1) represents a styrene maleic anhydride compound with styrene/maleic anhydride ratio of 4/1; and SMA (6/1) represents a styrene maleic anhydride compound with a styrene/maleic anhydride ratio of 6/1. In the table, CSR represents the core-shell rubber body; Ricon 100 is a butadiene-styrene copolymer; EG represents E-Glass. The addition unit of each component in the table is grams.

Materials

BPA-BZ was produced by A.C.R Tech Company; the filler $SiO_2$ was produced by Sibelco (10 μm cut); the thermosetting resin BMI was produced by Daiwa Fine Chemicals Company; the brominated epoxy resin was produced by Chang Chun Plastics Company; the reinforcing material was produced by Taiwan Glass industry Corporation (E-Glass glass fabric 2116); the toughening resin CSR was produced by Kaneka Corporation and Ricon 100 was produced by Polyscope Company; and the copper foil was produced Nan Ya Plastics Corporation (H1 0.5 OZ).

Technical Feature Test

White streak test: A mechanical drill was used to drill 100 mechanical holes on the sample, with an inner diameter of 0.3 mm, and the number of white streaks and hole cracks in the drilled holes were observed.

CTE test: According to IPC-TM-650 2.4.24.5 norm, the change rate of the coefficient of thermal expansion in the Z-axis direction (total z-CTE) of the coefficient of thermal expansion (CTE) of the sample to be tested at a temperature below the glass transition temperature (Tg) was measured using a thermal mechanical analyzer (TMA). Z-CTE was measured in the temperature range of 50° C. to 260° C., and the unit is %.

Adhesive strength test: Adhesive strength refers to the adhesion of the metal foil to the laminated prepreg. In this test, the copper foil with a width of ⅛ inch was torn vertically from the board surface, and the strength of the adhesion is expressed by the required force. The unit of tear strength is lbf/in.

Heat resistance test: The dried metal foil laminate was immersed in a solder bath at 288° C. for 100 seconds, and the process was repeated 3 times. Based on the above heat resistance test, "○" was given if the heat resistance is excellent, and "x" was given if there were blisters on the appearance which means that the heat resistance is not good.

From the above results, it can be seen that Example Laminates 1-10 containing the toughened resin composition of the present disclosure show good mechanical and electrical properties, low water absorption, and reducing the amount of externally added toughening agent or rubber. In contrast, Comparative Example Laminates 1-6 containing SMA without toughening and modification were hard and brittle after cross-linking, and had poor mechanical properties, which cannot be improved even if a large amount of toughening agent or rubber was added externally. Thus, the present disclosure is more suitable for application in a wide range of fields such as composite materials and electronic circuit materials.

In summary, the present disclosure provides a toughened resin composition, including a toughened and modified compound, which is a SMA compound toughened and modified by an olefin polymer, and formed a polyimide bond with a diisocyanate compound. As a result, the toughened resin compound of the present disclosure has excellent electrical and mechanical properties and low water absorption. Thus, compared with the related-art SMA polymer resin composition whose mechanical properties are brittle after cross-linking, the toughened resin composition provided herein is more suitable for use in composite materials, electronic circuit materials, etc. In addition, the toughened resin composition of the present disclosure may also be applied in a wide range of fields such as aerospace, electronic motor, automobile industry and the like.

As used herein and not otherwise defined, the terms "substantially," "approximately" and "about" are used to describe small variations. When used in conjunction with an event or circumstance, the term can include the exact point at which the event or circumstance occurs, as well as the event or circumstance occurring to a near approximate point. For example, when combined with a numerical value, the term can include a range of variation less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

The above has descripted the components of several examples so that the concepts of the embodiments of the present disclosure may be better understood by those skilled in the art to which the present disclosure pertains. It should be understood by those skilled in the art to which the present disclosure pertains that the embodiments of the present disclosure may be used as a basis for designing or modifying other processes and structures for carrying out the same purposes and/or achieving the same effect as the embodiments described herein. It should also be understood by those skilled in the art to which the present disclosure pertains that these equivalent structures do not depart from the spirit and scope of the present disclosure, and various modifications, alterations, substitutions and other options can be made without departing from the spirit and scope of the present disclosure. Therefore, the protection scope of the present disclosure shall be determined by the appended claims.

What is claimed is:

1. A toughened resin composition, comprising:

(A) a toughened and modified compound, comprising a styrene maleic anhydride compound, an anhydride grafted olefin polymer, and a diisocyanate compound;

(B) a thermosetting polymer; and (C) a toughening resin;

wherein, in the toughened and modified compound, the diisocyanate compound forms a polyimide bond with the styrene maleic anhydride compound and the anhydride grafted olefin polymer, respectively;

wherein (A):(B):(C) is 15 to 30:20 to 35:0.1 to 5.

2. The toughened resin composition of claim 1, wherein the toughening resin is a core-shell polymer and/or a polybutadiene resin.

3. The toughened resin composition of claim 1, wherein the thermosetting polymer is bismaleimide (BMI) resin, bismaleimide triazine polymer, cyanate ester polymer, benzocyclobutene polymer, or phenolic resin.

4. The toughened resin composition of claim 1, wherein the ratio of styrene and maleic anhydride in the styrene maleic anhydride compound is 3:1 to 6:1.

5. The toughened resin composition of claim 1, wherein the anhydride grafted olefin polymer comprises: styrene-ethylene/butylene-styrene copolymer grafted maleic anhydride, polypropylene grafted maleic anhydride or polyethylene grafted maleic anhydride.

6. The toughened resin composition of claim 1, wherein the diisocyanate compound is selected from the group consist of trimethylene diisocyanate, tetramethylene diisocyanate, pentamethylene diisocyanate, hexamethylene diisocyanate, 1,2-propylene diisocyanate, 1,3-butylene diisocyanate, dodecamethylene diisocyanate, 2,4,4-trimethylhexamethylene diisocyanate, 1,3-cyclopentene diisocyanate, 1,3-cyclohexane diisocyanate, 1,4-cyclohexane diisocyanate, methylene dicyclohexyl diisocyanate, isophorone diisocyanate, hydrogenated diphenylmethane diisocyanate, hydrogenated xylylene diisocyanate, hydrogenated toluene diisocyanate, hydrogenated tetramethyl xylylene diisocyanate, phenylene diisocyanate, 2,4-toluene diisocyanate, 2,6-toluene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate and xylylene diisocyanate.

7. The toughened resin composition of claim 1, further comprising: a filler, and the filler is selected from the group consist of silicon dioxide, aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, barium sulfate, magnesium carbonate, barium carbonate, mica, talc, and graphene.

8. The toughened resin composition of claim 3, further comprising: a filler, and the filler is selected from the group consist of silicon dioxide, aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, barium sulfate, magnesium carbonate, barium carbonate, mica, talc, and graphene.

9. The toughened resin composition of claim 4, further comprising: a filler, and the filler is selected from the group consist of silicon dioxide, aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, barium sulfate, magnesium carbonate, barium carbonate, mica, talc, and graphene.

10. The toughened resin composition of claim 1, further comprising: a polybenzoxazine compound, and the polybenzoxazine compound is a bisphenol type polybenzoxazine or a bisamine type polybenzoxazine.

11. The toughened resin composition of claim 3, further comprising: a polybenzoxazine compound, and the polybenzoxazine compound is a bisphenol type polybenzoxazine or a bisamine type polybenzoxazine.

12. The toughened resin composition of claim 4, further comprising: a polybenzoxazine compound, and the polybenzoxazine compound is a bisphenol type polybenzoxazine or a bisamine type polybenzoxazine.

13. The toughened resin composition of claim 7, further comprising: a polybenzoxazine compound, and the polybenzoxazine compound is a bisphenol type polybenzoxazine or a bisamine type polybenzoxazine.

14. The toughened resin composition of claim 1, further comprising: a solvent, and the solvent is selected from the group consist of toluene, y-butyrolactone, methyl ethyl ketone, cyclohexanone, butanone, acetone, xylene, methyl isobutyl ketone, N,N-dimethylformamide, N,N-dimethylacetamide, N-methylpyrrolidone and combinations thereof.

15. The toughened resin composition of claim 3, further comprising: a solvent, and the solvent is selected from the group consist of toluene, γ-butyrolactone, methyl ethyl ketone, cyclohexanone, butanone, acetone, xylene, methyl isobutyl ketone, N,N-dimethylformamide, N,N-dimethylacetamide, N-methylpyrrolidone and combinations thereof.

16. The toughened resin composition of claim 4, further comprising: a solvent, and the solvent is selected from the group consist of toluene, γ-butyrolactone, methyl ethyl ketone, cyclohexanone, butanone, acetone, xylene, methyl isobutyl ketone, N,N-dimethylformamide, N,N-dimethylacetamide, N-methylpyrrolidone and combinations thereof.

* * * * *